United States Patent [19]
Johansen et al.

[11] Patent Number: 5,960,817
[45] Date of Patent: Oct. 5, 1999

[54] CONTROL VALVE AND SYSTEM FOR FUEL VAPOR RECOVERY

[75] Inventors: Mark R. Johansen, Cheshire; Timothy P. Neal, Harwington; Jason J. St. Pierre, North Haven, all of Conn.

[73] Assignee: Walbro Corporation, Cass City, Mich.

[21] Appl. No.: 08/963,340

[22] Filed: Nov. 3, 1997

[51] Int. Cl.⁶ .................................................. F16K 24/04
[52] U.S. Cl. ............................................. 137/202; 137/43
[58] Field of Search ....................................... 137/43, 202

[56] References Cited

U.S. PATENT DOCUMENTS

| | | | |
|---|---|---|---|
| 5,535,772 | 7/1996 | Roetker et al. | 137/202 X |
| 5,592,963 | 1/1997 | Bucci et al. | 137/202 |
| 5,687,753 | 11/1997 | Doll | 137/43 |

*Primary Examiner*—Gerald A. Michalsky
*Attorney, Agent, or Firm*—Reising, Ethington, Barnes, Kisselle, Learman & McCulloch, P.C.

[57] ABSTRACT

A vehicle on board system for recovering fuel vapors from the fuel tank both during filling of the fuel tank with volatile hydrocarbon liquid fuel and operation of the vehicle engine. A control unit in the fuel tank has a valve assembly actuated by a float to control the flow of fuel vapors from the top of the tank into a receiving canister with activated charcoal for absorbing the fuel vapors which can be purged from the canister by operation of the engine. The valve assembly has a valve seat, a flexible elastomeric closure received on a pivotally mounted carrier plate movable to open and closed positions relative to the seat, and a stripper plate encompassing the seat, overlying the closure and pivotally movable by the float to disengage the closure from the seat to open the valve. Preferably, a pad on the stripper plate bears on only a portion of the flexible closure during initial opening of the valve to thereby decrease the force required to initially open the valve and increase the sensitivity and responseness of the valve assembly. Preferably, to substantially prevent any liquid fuel from passing through the valve assembly while it is open, a depending tube encircles the valve assembly and the float is slidably received in the tube with a relatively close fit to prevent fuel sloshing in the tank which enters the tube from being forced past the float and into the open valve assembly. Preferably, the passage for permitting fuel vapors to flow to the open valve assembly communicates with the tank at a position generally vertically below the valve assembly and preferably an intermediate portion of the passage is disposed generally vertically above the valve assembly and preferably above the fuel tank.

27 Claims, 4 Drawing Sheets

5,960,817

CONTROL VALVE AND SYSTEM FOR FUEL VAPOR RECOVERY

FIELD OF THE INVENTION

This invention relates to vehicle fuel tanks and more particularly to a control unit for a system preventing the escape of fuel vapor to the atmosphere.

BACKGROUND OF THE INVENTION

As concern for protection of the environment increases, regulations for preventing the escape to the atmosphere of volatile hydrocarbon fuel vapors are being promulgated by governmental agencies. One source of these hydrocarbon vapors is the fuel tanks of vehicles using gasoline or other hydrocarbon fuels of high volatility. With present automotive gas tank designs, fuel vapor can escape during the filling of tanks, and usually even after the fuel tank is filled. Furthermore, the person filling the tank with fuel from a gasoline pump can "overfill" the tank which significantly increases the escape of fuel vapor and often produces spit-back of liquid fuel which rapidly releases hydrocarbon vapor into the atmosphere.

The fuel dispensing nozzle of a typical station fuel pump has an automatic shut-off which is actuated by liquid fuel rising sufficiently in the fill tube of the fuel tank to at least momentarily cover and close off a control port immediately adjacent the outlet end of the dispensing nozzle. Closing this control port causes a vacuum actuated diaphragm and valve to automatically shut off the discharge of liquid fuel from the dispensing nozzle. With a typical prior vehicle fuel tank, this automatic shut off occurs when the fuel tank has been fully filled to the fuel level desired to provide a vapor dome in the tank above the liquid fuel having a predetermined desired minimum volume. However, by again manually actuating the fuel dispensing nozzle sufficient additional liquid fuel can be forced into the tank to create an overfilled condition which undesirably decreases or even eliminates the vapor dome in the tank, leaves liquid fuel in the tank fill pipe, produces substantial spit back of liquid fuel and sometimes discharges excess liquid fuel and fuel vapors to the atmosphere through the open tank fill pipe and/or a tank vent.

SUMMARY OF THE INVENTION

A control unit which substantially eliminates spit-back and overfilling with fuel of a vehicle fuel tank and controls the collection and recovery of hydrocarbon fuel vapor during filling of the tank and subsequent operation of the vehicle. A carbon canister receives fuel vapors through the control unit which is mounted in the top of the fuel tank. The canister communicates with the intake manifold of the vehicle engine for exhausting fuel vapor from the canister during operation of the engine. The control unit has a valve with a variable orifice and flow rate responsive to the level of fuel in the tank to fully open at a sufficiently low fuel level to permit fuel vapors to freely flow from the tank into the canister. A check valve adjacent the lower end of the control unit prohibits fuel from entering the control unit until the level of fuel in the tank rises sufficiently to enter openings through the sidewall of the control unit. As the fuel level rises in the control unit, the valve is gradually and continuously moved toward its fully closed position to restrict vapor flow and thereby cause actuation of the automatic shut-off of the fuel pump dispensing nozzle, and, if further filling is attempted, it continues to move to its fully closed position and cause actuation of the automatic shut-off of the fuel pump dispensing nozzle. This prevents significant actual further "over filling" of the tank and maintains the desired minimum volume of the vapor dome or space in the top of the "filled" fuel tank.

Preferably the valve has a seat and a pivotally mounted closure actuated by a float and providing a variable flow rate orifice and closure. Preferably the float opens the valve through a pivoted stripper plate which applies a force primarily to only a portion of a flexible valve closure to decrease the force required to initially open the valve and hence increases its sensitivity and responsiveness. Preferably, regardless of the fuel level, this valve also fully closes in the event of a roll-over accident to prevent liquid fuel and vapor from being discharged from the tank.

Preferably, to insure that essentially no liquid fuel passes through the open valve and into the carbon canister during normal operation of the vehicle, the openings through which fuel enters the control unit are relatively small and located sufficiently below the valve such that splashing or sloshing fuel does not reach the valve. Preferably, a separate vapor passage communicates with the valve through a convoluted flow path which extends generally vertically above the valve and preferably above the top of the tank and communicates with the interior of the tank at a point below the valve and above the bottom of the control unit.

Objects, features and advantages of this invention include a control unit for a fuel tank and vapor handling system which collects the refueling fuel vapors, routes fuel vapor to a canister receptor, prevents the escape of fuel vapor as the tank is filled, is actuated by the level of fuel in the tank, provides timely actuation of the automatic shut-off of a fuel dispensing nozzle as the tank reaches its desired maximum fuel level, prevents fuel spit-back during filling, prevents the canister from receiving liquid fuel, closes in a vehicle roll-over condition, maintains a fuel tank gas vapor dome under attempted overfilling conditions, is sensitive and responsive to changes in fuel level and is rugged, durable, reliable, and of relatively simple design, economical manufacture and assembly, and has a long useful life in service.

BRIEF DESCRIPTION OF THE DRAWINGS

These and other objects, features and advantages of this invention will be apparent from the following detailed description of the preferred embodiment and best mode, appended claims and accompanying drawings in which:

DETAILED DESCRIPTION

Figure 1:
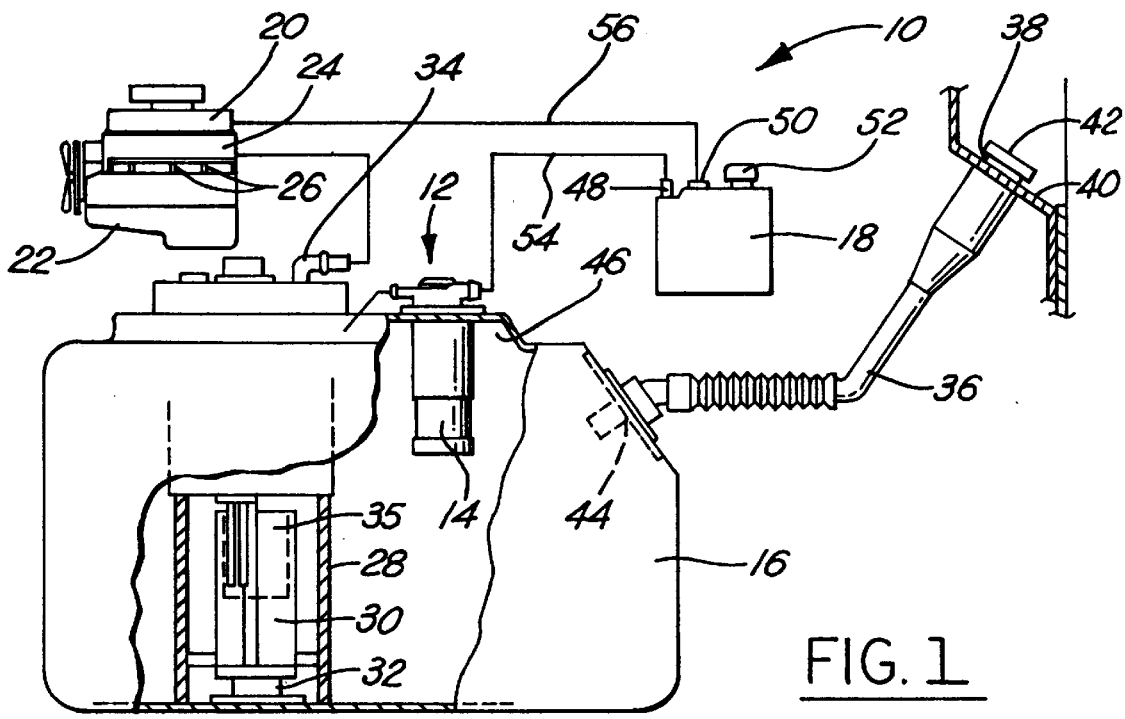
FIG. 1 is a semi-diagrammatic view of a vehicle fuel system with a fuel tank having a fill pipe, fuel pump module, vapor recovery canister, and a control valve unit embodying this invention.

FIG. 1 diagrammatically illustrates an automotive vehicle fuel system 10 with an on-board vapor recovery system 12 having a control valve unit 14 embodying this invention. The control unit 14 is mounted on the top of a fuel tank 16 and connected to a fuel vapor storage canister 18 which is connected to the intake manifold 20 of an internal combustion engine 22. Typically, liquid fuel is supplied to a fuel rail 24 and fuel injectors 26 of the engine by a fuel delivery module 28 in the tank which has a fuel pump 30 with a fuel inlet 32 adjacent the bottom of the tank and a fuel outlet 34 accessible from the exterior of the tank. The pump 30 is driven by an electric motor 35. The tank 16 is filled with liquid fuel through a fill pipe or tube 36 with an inlet 38 disposed vertically above the top of the tank and received in an access pocket 40 of the vehicle. The inlet 38 is closed and sealed by a removable gas cap 42. To prevent reverse flow of fuel from the tank through the fill pipe, preferably a check valve 44 is located at the lower end of the fuel pipe. Preferably, a raised area in the top wall of the tank provides a well defined vapor dome 46.

The check valve 44 may be of the ball, flapper, disc, duckbill or other type of suitable check valve permitting the free and rapid flow of fuel through the fill pipe and into the tank, and preventing reverse flow of fuel in the tank through the fill pipe. A presently preferred flexible disc-type check valve is disclosed in U.S. patent application Ser. No. 08/428, 340, filed on Apr. 25, 1995, now U.S. Pat. No. 5,660,206, the disclosure of which is incorporated herein by reference and hence the check valve 44 will not be described in further detail.

Typically, the canister 18 is filled with activated charcoal (preferably grade 15) to absorb the hydrocarbon vapors received from the control valve unit 14 through an inlet port 48 and to release and discharge the vapor through an outlet or purge port 50 into the intake manifold 20 of the engine. The interior of the canister is vented to the atmosphere through a port 52 in the top of the canister. In some applications, a check valve prevents reverse flow of the fuel vapor through the port 52 to the atmosphere. The canister is mounted in the vehicle and is connected to the control valve unit 14 and the intake manifold 20 by suitable flexible hoses 54 and 56.

As shown in FIGS. 2–5, the control valve unit 14 has a housing 60 with a valve assembly 62 which controls the flow of fuel vapor from the tank 16 to the canister 18. When the valve assembly is open fuel vapor can flow through an outlet passage 64 in the housing and a hose connector elbow 66 to the canister. A recirculation outlet 63 may be provided communicating the outlet passage 64 with another component of the fuel vapor recovery system such as another vapor canister. An over pressure relief valve 65 communicates the interior of the control valve unit 14 with the atmosphere through a third outlet 67 when a predetermined maximum pressure in the fuel tank is reached, typically 60 in. $H_2O$. The valve assembly 62 has a float 68 encircled by a tube 70 the upper end of which is press fit or otherwise secured in a depending integral skirt 72 of the housing. The housing 60 is snap fit onto the tube 70 and an outlet body 69 containing the outlet passage 63 and elbow 66 snap fits onto the housing 60. The housing has a flange 80 which is heat sealed or otherwise sealed to the outlet body 69 and in assembly is mounted on and sealed to the top of the fuel tank. Alternatively, the flange may be integrally formed with the outlet body 69.

The lower end of the tube 70 is closed by a check valve 71 preferably carried by an end cap 73 telescoped over the tube 70 and retained by fingers 75 of the tube 70 which snap-fit into circumferentially spaced slots 77. The check valve 71 prevents liquid fuel from entering the control unit 14 therethrough but permits fuel flow from the control unit 14 to the fuel tank 16. The check valve 71 has a disc 91 which is preferably formed of a flexible material such as neoprene rubber which is disposed over a central through opening 93 normally received on a plurality of circumferentially spaced ribs 95 extending generally radially from the opening 93 to provide passages for fuel to flow from the periphery of the disc 91 between its lower face and the end cap 73 to be discharged through the central opening 93. The bottom wall 97 of the tube also has a plurality of circumferentially spaced holes 99 through it which overlap the central opening 93 through the cap 73 and permit fuel to drain from the lower end of the tube 70 when the check valve 71 is open. The check valve 71 preferably is normally open and both sloshing fuel and the rise of fuel above the bottom of the tube 70 will force the disc 91 upward into sealing engagement with the holes 99 though the bottom wall 97 of the tube 70.

Fuel entry openings 78 in the sidewall of the tube 70 permit fuel to enter the control unit 14 and actuate the float 68 which is responsive to the level of fuel in the control unit 14. Fuel enters the openings 78 only after the check valve 71 has been closed and the fuel level has risen sufficiently around the outside of the tube 70 to pass through the openings 78. The openings 78 are relatively small and disposed sufficiently below the valve assembly 62 to prevent splashing or sloshing fuel within the fuel tank 16 from entering the valve assembly 62 or outlet passage 64. The axial location or height of the openings 78 can be changed to change the level at which fuel will enter the control unit 14 and subsequently move the valve assembly 62 towards its closed position to actuate the automatic shut-off of the fuel fill nozzle to thereby control the maximum fuel level in the tank 16.

Figure 4:
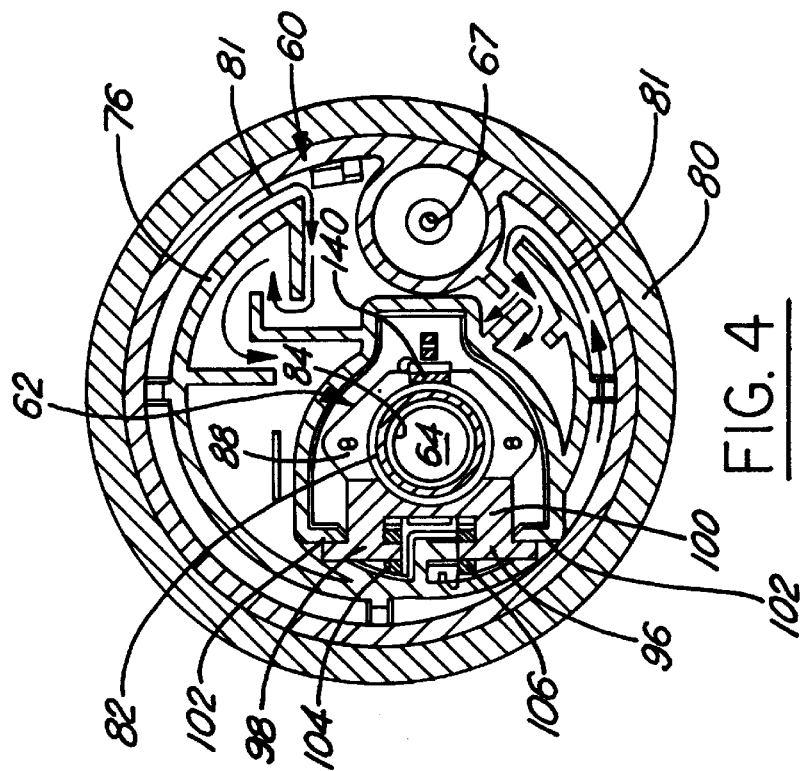
FIG. 4 is a sectional view of the control valve unit taken on line 4—4 of FIG. 3.
Figure 2:
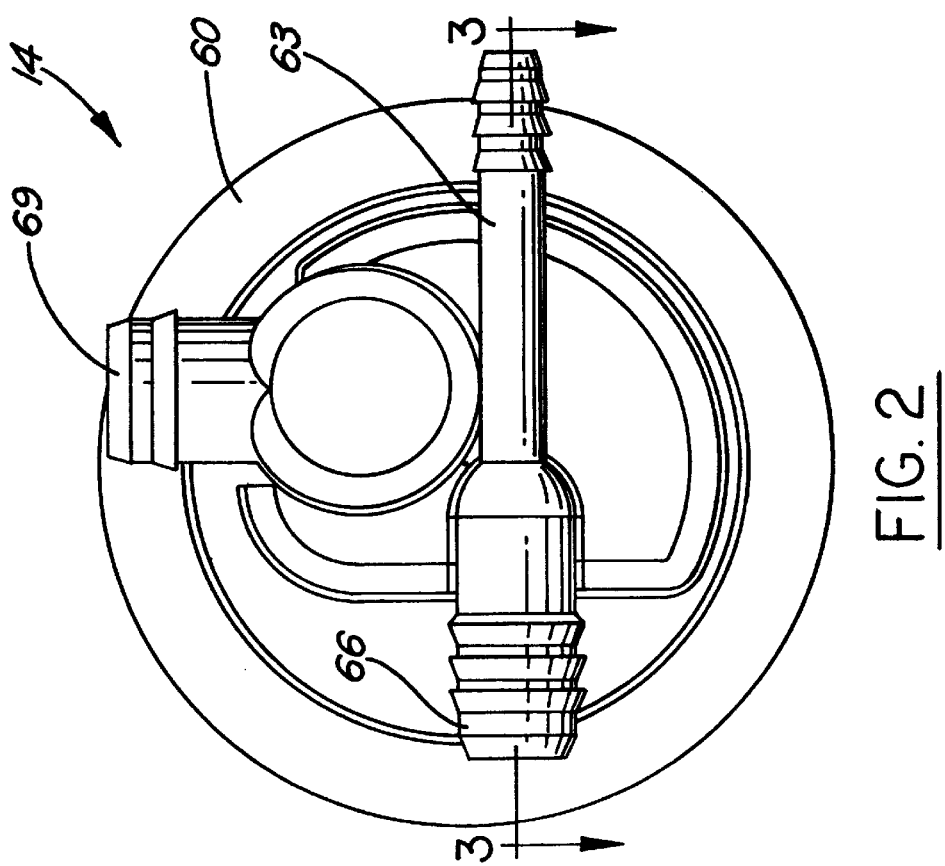
FIG. 2 is a top view of the control valve unit of FIG. 1.
Figure 3:
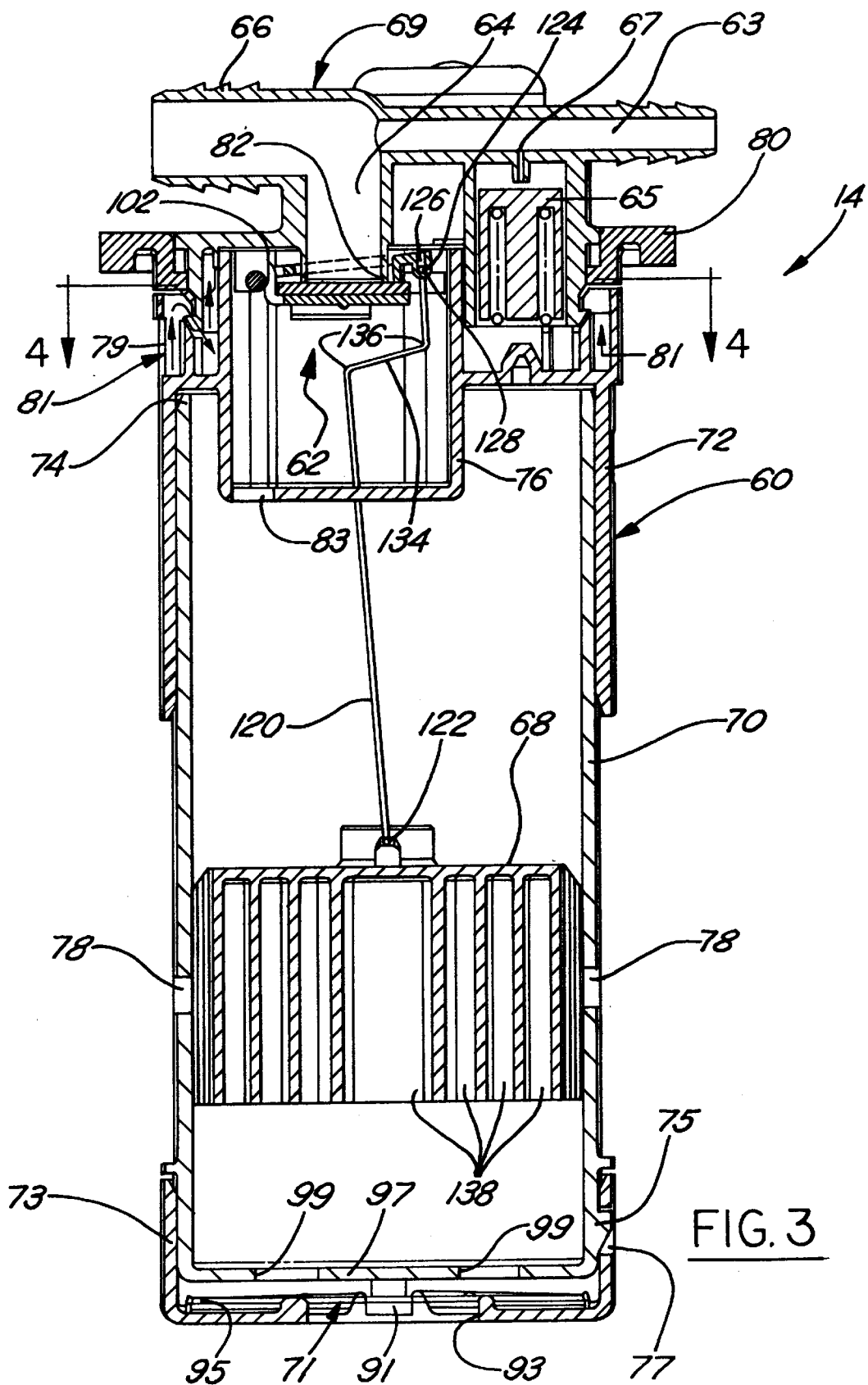
FIG. 3 is a sectional view of the control valve unit taken on line 3—3 of FIG. 2 with the valve assembly in its fully closed position.
Figure 5:
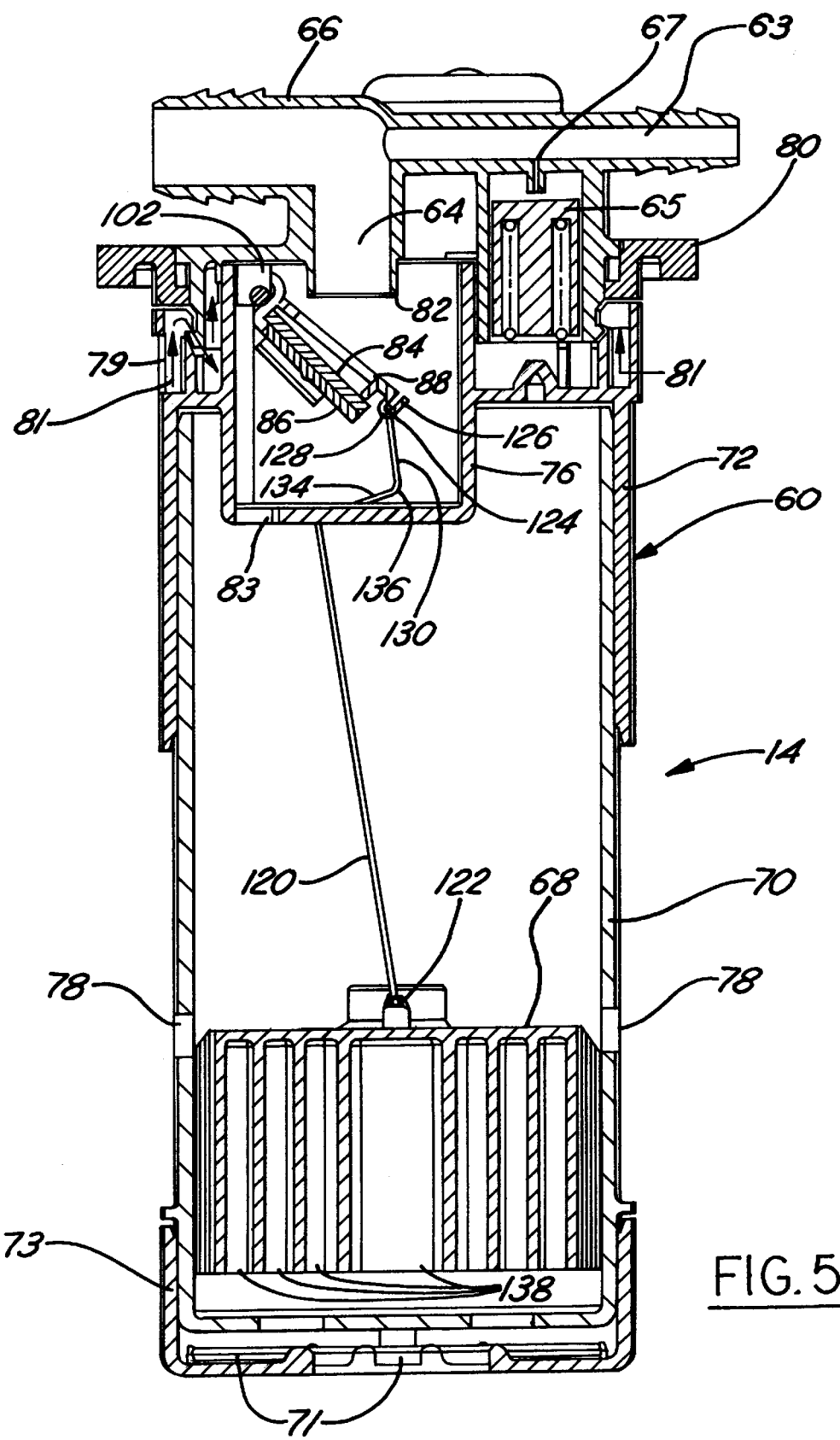
FIG. 5 is a sectional view per FIG. 3 with the valve assembly in its open position.

As shown in FIGS. 3–5, an integral cup-shaped wall 76 surrounds the valve assembly 62 interiorly of the housing skirt 72. One or more vapor inlets 79 are communicated with the valve assembly 62 through a convoluted or labyrinthine flow path 81 (as shown by the arrows in FIGS. 3 and 4) defined by the housing 60 and wall 76. The cooperation of the float 68 with the tube 70 and of this construction and arrangement of the fuel vapor flow path 81 substantially eliminates the passage of any liquid fuel through the open valve assembly 62. Even when liquid fuel is rapidly and violently sloshing around in the fuel tank 16, this float 68, tube 70 and fuel vapor flow path 81 arrangement permits the valve assembly to rapidly close before any substantial amount of liquid fuel passes through it. Any liquid which enters the cup-shaped wall 76 is drained therefrom through an opening 83 in the wall 76.

As shown in FIGS. 3–5, the valve assembly 62 has a depending valve seat 82 encircling the outlet passage 64, a cooperating elastomeric valve closure 84 received on a carrier plate 86 mounted for pivotal movement by a stripper plate 88 actuated by the float 68 and yieldably biased toward their closed position by a spring 90. The stripper plate 88 has a clearance opening 94 which in assembly is received around the raised seat 82 and a pair of integral and coaxial pivot shafts 96 and 98 fixed to tabs 100. In assembly the outer ends of the shafts 96 and 98 are received and journalled for rotation in blind slots 102 in the upper end of the wall 76. This mounts the stripper plate 88 so that it can pivotally move between the fully closed position shown in FIG. 3 and the fully open position shown in FIG. 5.

In assembly, the carrier plate 86 is journalled for pivotal movement by a pair of spaced apart integral fingers 104 and 106 with return bend portions 108 received between the stripper plate tabs 100 and journalled on the pins 96 and 98. In assembly, the elastomeric closure 84 is received between the stripper plate 88 and the carrier plate 86 and located on the carrier plate by a pair of integral pins 110 projecting through complementary holes 112 in the closure 84 and into oversized clearance holes 114 in the stripper plate. The thickness of the stripper plate 88 is less than the vertical projection of the valve seat 82 so that when the valve is fully closed as shown in FIG. 3, the end face of the seat 82 projects through the stripper plate 88 and into firm sealing engagement with the elastomeric closure 84. Preferably, the closure 84 is made of a relatively soft and flexible elastomeric material with a high resistance to deterioration in use by contact with hydrocarbon fuel and fuel vapors such as a fluoro-silicone rubber having a durometer usually in the range of about 15–70, desirably about 20–65, and preferably about 40–60 on the Shore A scale.

Figure 6:
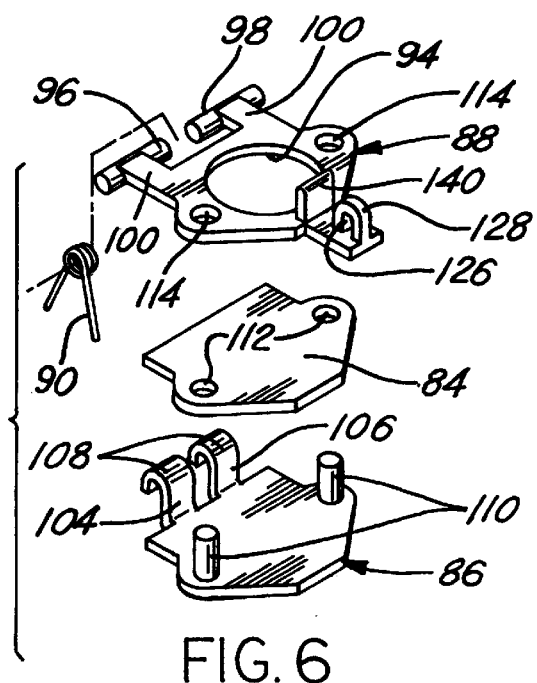
FIG. 6 is an exploded perspective view of some of the components of the valve assembly.

The opening defined by the valve seat 82 is preferably relatively large to permit a high fuel vapor flow rate therethrough with very little resistance to flow when the valve assembly 62 is open. This high flow rate capability is necessary especially during refueling when liquid fuel may be added to the tank 16 at a rate of 10 to 12 gallons per minute which displaces a similar volume of fuel vapor at a similar rate from the fuel tank 16. Preferably, the valve seat 82 is generally circular, as shown in FIGS. 4 and 6, and has a diameter of approximately 0.5 inch. Other configurations of the valve seat 82, besides generally circular, may be used as long as the high fuel vapor flow rate capability is maintained. Whatever the valve seat 82 configuration the closure 84 sealingly engages the valve seat 82 when the valve assembly 62 is closed to prevent fluid flow therethrough.

The float 68 is slidably received on the lower portion of a rigid wire 120 and retained thereon by a right angle bent portion 122 at its lower end. The other end of the wire 120 is pivotally connected to the free end of the stripper plate 88 by a right angle bent portion 124 pivotally received in a bore or opening 126 formed by an integral loop or tab 128 adjacent the free end of the stripper plate 88. The wire 120 extends through a preferably elongate opening (not shown) through the cup-shaped wall 76. To align the float 68 in the tube 70 and provide clearance for the wire 120, it has an offset intermediate portion 134 formed by bends 136.

As shown in FIGS. 3 and 5, the float 68 is slidably received for reciprocation in the tube 70 and is responsive to the level of fuel in the control unit 14 to move the valve assembly 62 toward its closed position when acted on by liquid fuel. Several annular blind recesses 138 are preferably formed in the float 68 and are filled with air and/or fuel vapor within the control unit 14. The air and fuel vapor becomes trapped within the recesses 138 when the level of liquid fuel in the control unit 14 reaches the bottom of the float 68. The trapped gases in the recesses 138 make the float 68 buoyant in the liquid fuel so that the float 68 rises with the rising fuel level in the control unit 14. Typically, the float 68 has a specific gravity which is greater than that of the liquid fuel with which the control unit 14 is utilized and is preferably made of a non-porous plastic material which is highly resistant to degradation by contact with hydrocarbon fuel such as a high density acetal polypropylene polymer having a density of about 1.0 gram per cubic centimeter. Usually, the fuel has a specific gravity of about 0.6 to 0.8 and the float 68 has a specific gravity of about 0.9 to 1.4 and preferably about 1.0.

In the event of a vehicle rollover in which the control unit 14 is turned upside down the valve assembly 62, is maintained in its fully closed position by the forces produced by the spring 90, gravity acting on the float 68, and the head of any liquid fuel overlying the valve assembly 62 and acting on the carrier plate 86 and hence the closure seal 84 to urge it into firm sealing engagement with the seat 82. In the rollover attitude, the sum of these forces must exceed the opposing force produced by the maximum buoyancy of the float when submerged in liquid fuel to a level just below its open end.

Of course, when the unit 14 is in its normal upright position, as shown in FIG. 3, the force produced by the spring 90 must be less than the force of gravity acting on the float 68 and the valve assembly 62 when they are not immersed in any fuel so that the valve assembly 62 will be in its fully open position as shown in FIG. 5. When the unit is in its normal upright position, the force produced by the spring 90 must also be sufficient so that when the float is immersed in liquid fuel the spring will move the valve assembly 62 to its fully closed position as shown in FIG. 3.

Preferably to reduce the force required to initially slightly open the fully closed valve assembly 62, the stripper plate 88 has a raised protuberance or pad 140 (FIGS. 4 and 6) which when the valve is fully closed bears on the underlying seal element 84 outside of and immediately adjacent the valve seat 82. When a valve opening force is initially applied by the float 68 acting on the stripper plate, the pad 140 applies a force primarily to only the area of the resilient closure 84 immediately adjacent the pad 140 which causes this area to be the first portion of the closure 84 to disengage from the seat 82 to thereby initially slightly open the valve assembly. This initial slight opening of the valve assembly 62 relieves any differential pressure acting on the entire valve assembly due to superatmospheric vapor pressure within the tank and thereby decreases the magnitude of the force required to open the valve. The effect of the force applied by the pad 140 to the closure 84 is also increased by the lever arm produced by the pivotally mounted stripper plate 88.

Operation

Typically, to fill an at least partially empty vehicle tank 16 with a liquid fuel, such as gasoline or diesel fuel oil, the filler cap 42 is removed, a dispensing nozzle with an automatic shut-off of a station fuel pump is inserted into the inlet 38 of the fill pipe and the nozzle valve is manually opened to discharge liquid fuel through the fill pipe 36, check valve 44, and into the tank 16, usually at a flow rate of 10 to 12 gallons per minute. The fuel flowing into the tank produces a superatmospheric pressure in the tank which forces fuel vapor through the control unit 14 (and its open valve assembly 62, passage 64 and outlet coupling 66) and into the canister 18. So long as the float 68 is not in any liquid fuel, its weight overcomes the force of the spring 90 and the valve assembly 62 remains fully open as shown in FIG. 5.

During filling, as the rising liquid fuel level in the tank reaches the bottom of the tube 70 the check valve 71 is closed and as the fuel level further rises and reaches the openings 78, liquid fuel enters the tube 70 and the float 68 becomes at least partially submerged in fuel and begins to move upward and the bias of the spring 90 begins to move the valve assembly 62 toward its closed position. As this fuel level continues to rise, the valve assembly 62 continues to move progressively toward its fully closed position until fully closed. As shown in FIG. 3, in its fully closed position the resilient closure 84 is in sealing engagement with the seat 82. This stops the flow of fuel vapor through the outlet 64.

As the valve assembly 62 becomes partially closed it substantially restricts the flow of fuel vapor sufficiently to increase the pressure within the tank and cause liquid fuel to rise in the filler pipe 36 and actuate the automatic shut-off of the fuel dispensing nozzle of the station pump. The automatic shut-off mechanism of the nozzle has a small control or aspirator port adjacent the nozzle outlet which when closed by liquid fuel in the fill pipe causes its diaphragm mechanism to "automatically" shut-off the discharge of fuel from the dispensing nozzle.

This substantial restriction of flow without an abrupt stoppage of flow is believed to provide a "softer" or somewhat slower rise of fuel in the filler pipe to actuate the automatic shut-off of the dispensing nozzle without "spitback" or discharge of liquid fuel from the inlet of the filler pipe to the atmosphere. Regardless of any theoretical explanation the control unit 14 produces substantially no fuel spit-back while still timely actuating the automatic shut-off of the dispensing nozzle.

If the fuel dispensing nozzle is again manually actuated or opened to "overfill" the tank, the additional fuel causes further progressive closure of the valve assembly 62 and the fuel level to rise more rapidly in the fill tube 36 and again actuate the automatic shut-off of the dispensing nozzle and thereby prevent the tank from being overfilled to the extent that it decreases the volume of the vapor dome 46 below a predetermined desired minimum volume. This also circumvents further efforts to overfill the tank by repeatedly manually actuating the dispensing nozzle by temporarily retaining liquid fuel in the fill tube which actuates the automatic shut-off of the dispensing nozzle. Repeated sufficient attempts to "overfill" the tank will completely close the valve assembly 62. After filling of the tank is completed, the dispensing nozzle is removed and the cap 42 is reinstalled to close the inlet 38 of the fill pipe.

When and while the float 68 causes the valve assembly 62 to remain closed, the closed valve assembly also prevents liquid fuel from being forced from the tank through the outlet 64 and into the vapor canister 18 thereby protecting the vapor canister from being saturated with liquid fuel which would be discharged to the atmosphere.

After the tank is filled and the vehicle is operated, eventually sufficient fuel will be consumed from the tank 16 so that the fuel level in the tube 70 drops sufficiently that the weight of the float 68 acting on the wire 120 produces enough force to open the valve assembly 62. The force produced by the float is applied through the wire 120 to the stripper plate 88 which through the pad 140 initially applies a force to the resilient and flexible closure 84 primarily only in the area adjacent the pad 140 so that the closure 84 initially opens or disengages from the seat 82 only adjacent the portion contacted by the pad 140. This reduces the force required to initially open the closure 84 by initially "peeling away" only a portion of it from the seat 82. If just prior to initial opening of the valve, the pressure in the tank is superatmospheric, which increases the closing forces acting on the closure 84, this peel away initial opening relieves this superatmospheric pressure as well as reduces the opening force required to overcome this superatmospheric pressure closing force by greatly reducing the area of the closure 84 being initially opened. This will also break any hydrostatic seal at the seat 82 and readily peel away and release the closure 84 as the stripper plate 88 pivots away from the seat 82 as the float 68 descends.

When the valve assembly 62 is open and the engine is operating, vapor will be removed from the canister 18 and drawn through the port 50 and conduit 56 into the intake manifold 20 of the engine where the fuel vapor will be mixed with intake air and supplied to the cylinders of the operating engine. This may also produce a sufficient vacuum or a sufficiently subatmospheric pressure in the canister 18 that fuel vapor in the fuel tank will flow through the open outlet 64 of the control unit 14 and into the canister, particularly if the atmospheric vent 52 of the canister contains a check valve or a solenoid valve which prevents or restricts reverse flow of atmospheric air through the passage 52 into the canister.

Typically, when the engine is shut-off and the valve assembly 62 is completely open, fuel vapor will flow from the tank through the control unit 14 and into the canister when the pressure in the tank is greater than atmospheric pressure by as little as about one inch to three inches of water pressure or about 0.04 to 0.1 pounds per inch square. Thus, the canister 18 and the control unit 14 provide negligible resistance to the flow of fuel vapor from the tank whenever the valve assembly 60 of the control unit is open.

What is claimed is:

1. A vapor control apparatus for a vehicle fuel tank for containing volatile hydrocarbon liquid fuel which comprises: a housing constructed to be received in a vehicle fuel tank adjacent the top of the tank, a vapor inlet formed in the housing adjacent to the top of the housing and permitting a relatively free flow of fuel vapor between the fuel tank and the interior of the housing; an outlet passage carried by the housing for communicating with the exterior of the tank, a valve seat carried by the housing immediately adjacent the top of the tank and having a continuous perimeter bounding a valve opening communicating with the outlet passage for supplying to the outlet passage fuel vapor from the interior of the tank, a valve head pivotally carried by the housing and movable to a closed position bearing on the valve seat to prevent fluid flow through the valve opening and to an open position spaced from the closed position, a check valve disposed adjacent the bottom of the housing and spaced from the vapor inlet to prevent fuel from entering the housing therethrough without restricting the flow of fuel vapor through the vapor inlet and to permit fuel to drain from the housing when the fuel level in the tank is lower than the fuel level in the housing, at least one fuel entry opening in the housing above the check valve and through which fuel from the fuel tank enters the housing, and a float operably connected with the valve head and responsive to the level of liquid fuel in the housing to move the valve head to the open position thereof when the level of fuel in the tank is below a first predetermined level and to move the valve head to its closed position when the fuel in the tank is at a second level above the first level.

2. The apparatus as defined in claim 1 which also comprises a cup-shaped wall carried by the housing and extending around the valve seat to prevent liquid fuel from passing through the outlet passage when the valve head is in the open position.

3. The apparatus as defined in claim 2 wherein the housing has a tube depending from the housing and the float is received in the tube.

4. The apparatus as defined in claim 1 which also comprises a flexible closure carried by the valve head, constructed to engage the valve seat and formed of an elastomeric material having a durometer in the range of about 15 to 75 on the Shore A scale.

5. The apparatus of claim 4 which also comprises a stripper plate pivotally carried by the housing and having at least one pad constructed to bear on the closure at a location immediately adjacent the seat and spaced from the pivotal axis of the stripper plate to apply a force to the closure for initially opening the valve.

6. The apparatus of claim 1 wherein the stripper plate also comprises at least one pad constructed to bear on a portion of the closure at a location immediately adjacent the seat and distal from the pivotal axis of the stripper plate to apply substantially to only an area of the closure adjacent the pad the force for initially opening at least a part of the closure adjacent the pad before opening a portion of the closure adjacent the pivotal axis of the stripper plate.

7. The apparatus as defined in claim 6 in which said closure is a body of an elastomeric material having a durometer in the range of about 20 to 70 on the Shore A scale.

8. The apparatus of claim 1 wherein the valve seat has a generally circular configuration.

9. The apparatus as defined in claim 1 which also comprises a tube depending from the housing and extending around the valve seat and valve head, the lower end of the tube being closed by the check valve, and the float being slidably received in the tube and having a peripheral portion with a relatively close fit with the tube wall to prevent any substantial quantity of liquid fuel from passing beyond the float and into the valve opening when the valve head is in an open position.

10. The apparatus as defined in claim 9 which also comprises a skirt carried by the housing and, in part, defining a vapor flow passage communicating with the valve opening when the valve head is in an open position, and having an inlet communicating with the interior of the fuel tank which is generally vertically below the valve seat and above the lower end of the tube.

11. The apparatus as defined in claim 10 wherein a portion of the vapor flow passage between its inlet and the valve opening is disposed generally vertically above the valve seat.

12. The apparatus as defined in claim 9 which also comprises a vapor flow passage carried by the housing, communicating with the valve opening when the valve head is in an open position and having an inlet communicating with the interior of the fuel tank at a location generally vertically below the valve seat and above the lower end of the tube.

13. The apparatus as defined in claim 12 wherein the vapor flow path is defined in the housing by several axially extending and radially spaced walls which provide a convoluted vapor flow path to prevent liquid fuel from passing completely through the vapor flow path and into the valve opening.

14. The apparatus as defined in claim 9 wherein the housing comprises an outlet body which carries the outlet passage and a vapor flow path housing with axially extending and radially spaced walls defining a convoluted vapor flow path communicating the interior of the fuel tank with the valve opening, and the outlet body is snap-fit together with the vapor flow path housing which is snap-fit together with the tube.

15. The apparatus as defined in claim 14 wherein the outlet body has an integral flange which in assembly, overlies a portion of and is sealed to the fuel tank.

16. The apparatus as defined in claim 14 which also comprises an annular flange member which is sealingly connected to the outlet body and, in assembly, overlies a portion of and is sealed to the fuel tank.

17. The apparatus as defined in claim 9 which also comprises an end cap which carries the check valve and which is snap-fit onto the tube.

18. The apparatus as defined in claim 1, which also comprises at least one fuel drain opening in the housing and wherein the check valve is formed of a thin disk of a flexible material having an opening offset from each fuel drain opening of the housing and through which fuel may drain from the housing when the fuel level in the tank is lower than the fuel level in the housing and when liquid fuel in the fuel tank contacts the check valve it is moved into sealing engagement with the housing to prevent fuel flow into the housing through the fuel drain opening.

19. A vapor control apparatus for a vehicle fuel tank for containing volatile hydrocarbon liquid fuel which comprises: a housing constructed to be received on a fuel tank adjacent the top of the tank, an outlet passage carried by the housing for communicating with the exterior of the tank for supplying fuel vapor from the interior of the tank to the exterior of the tank, a valve assembly carried by the housing adjacent the top of the tank and movable to a closed position and to an open position to communicate with the outlet passage for supplying to the outlet passage fuel vapor from the interior of the tank, a float responsive to the level of liquid fuel in the tank to move the valve assembly to its open position when the level of fuel in the tank is below a first predetermined level and to permit the valve assembly to move to its closed position when the fuel level in the tank is at a second level above the first level, a depending tube carried by the housing and extending around the valve assembly and the float, the float being slidably received in the tube and having a portion in the tube in close proximity with the tube to substantially prevent liquid fuel sloshing in the tank which enters the interior of the tube from passing beyond the float and through the valve assembly when it is in an open position, a check valve disposed adjacent the lower end of the tube to prevent liquid fuel from entering the tube therethrough and to permit fuel to drain from the housing when the fuel level in the tank is lower than the fuel level in the housing even when submerged in liquid fuel, at least one fuel entry opening in the tube spaced above the check valve and through which liquid fuel may enter the tube, and a fuel vapor passage carried by the housing, communicating with the valve assembly to permit the flow of fuel vapor from the interior of the tank to the outlet passage when the valve assembly is open, and having an inlet communicating with the interior of the fuel tank at a position generally vertically above the fuel entry opening and the float, whereby when the housing is received on a vehicle fuel tank in a normal operating position and liquid fuel sloshes in the tank substantially no liquid fuel enters the outlet passage when the valve assembly is open.

20. The apparatus as defined in claim 19 wherein the inlet of the vapor passage is also generally vertically below the valve assembly.

21. The apparatus as defined in claim 19 which also comprises a skirt carried by the housing and, in part, defines the vapor flow passage communicating with the valve opening when the valve assembly is in an open position, and the inlet communicating with the interior of the fuel tank is generally vertically below the valve assembly and above the lower end of the tube.

22. The apparatus as defined in claim 19 wherein a portion of the vapor flow passage between its inlet and the valve assembly is disposed generally vertically above the valve assembly.

23. The apparatus as defined in claim 19 wherein the vapor flow path is defined in the housing by several axially extending and radially spaced walls which provide a convoluted vapor flow path to prevent liquid fuel from passing completely through vapor flow path and through the valve assembly.

24. The apparatus as defined in claim 19 wherein the housing comprises an outlet body which carries the outlet passage and a vapor flow path housing with axially extending and radially spaced walls defining a convoluted vapor flow path communicating the interior of the fuel tank with the outlet passage through the valve assembly, and the outlet body is snap-fit together with the vapor flow path housing which is snap-fit together with the tube.

25. The apparatus as defined in claim 24 wherein the outlet body has an integral flange which in assembly, overlies a portion of and is sealed to the fuel tank.

26. The apparatus as defined in claim 24 which also comprises an annular flange member which is sealingly connected to the outlet body and, in assembly, overlies a portion of and is sealed to the fuel tank.

27. The apparatus as defined in claim 19 which also comprises an end cap which carries the check valve and which is snap-fit onto the tube.

* * * * *